Patented Apr. 2, 1940

2,195,756

UNITED STATES PATENT OFFICE 2,195,756

PRODUCTION OF CALCIUM HYPOCHLORITE PRODUCT

Maurice C. Taylor, Niagara Falls, N. Y., assignor to The Mathieson Alkali Works, Inc., New York, N. Y., a corporation of Virginia No Drawing. Application July 20, 1938, Serial No. 220,263

7 Claims. (Cl. 23—86)

My invention relates to improvements in the manufacture of granular, substantially dustless calcium hypochlorite products from aqueous slurries containing calcium hypochlorite.

Calcium hypochlorite products containing more than about 10% by weight of material which will pass a 100 mesh screen are characteristically dusty. Such dusty products suffer several disadvantages. Dustiness itself is objectionable. Further, however, the presence of such proportions of fines retards the penetration of water into masses of the product thus increasing the time required for solution, involves a tendency to form lumps during solution and involves a tendency toward packing and caking of the product during shipment and storage. Conventional practices for the production of dry calcium hypochlorite products of predetermined maximum particle size introduce, into the product, proportions of minus 100 mesh material usually much in excess of 10% and of this fine material a large proportion usually will pass a 300 mesh screen.

According to my invention a granular free flowing substantially dustless calcium hypochlorite product is produced from calcium hypochlorite slurries having a water content in excess of 30%, advantageously between 42% and 48%, by admixing therewith a proportion of a finely divided dry calcium hypochlorite product sufficient to reduce the water content of the mixture to a value between about 20% and 30%, and thereafter drying the mixture without substantial crushing of the material. This process of my invention is advantageous in two aspects. It provides a method for producing a granular, substantially dustless calcium hypochlorite product and concurrently a method for utilizing a finely divided or dusty dry calcium hypochlorite which in itself would not be marketable.

In carrying out the process of my invention, the surfaces of the particles of calcium hypochlorite in the slurry, when admixed with the finely divided dry calcium hypochlorite, become covered with the finely divided dry product. These wet particles themselves are thus transformed into non-adhesive granules. As a result of the mixing operation of my process, granulation takes place and the resulting granular product has a water content between about 20% and 30%, the specific value in each instance depending on the proportion of dry product employed. I have found that a granular mixture having a water content of approximately 24–26% is particularly advantageous at this stage in my process. When the water content is between 20% and 24% a minor quantity of the finely divided calcium hypochlorite may not become attached to the surfaces of the granules when the mixing is complete. This unattached dust may be removed by an air stream, or it may attach itself to the granular surfaces on standing. Thus, in the case of a mixture containing 21% water, free finely divided particles will attach themselves to the granules on standing for about 18 hours, while if the water content is 23% the finely divided material will become attached to the granular surfaces in a period of about one hour. When a mixture having a water content of 24% is produced, any slight excess of dust remaining after mixing is taken up by the granular calcium hypochlorite material in about 10 minutes. Granular mixtures having water contents between about 26% and 30% are free of dust, but with such mixtures continued mixing has a tendency to destroy the dust film attached to the surfaces of the granules and to render them mildly adhesive and in some instances even semi-plastic.

In carrying out my invention, the calcium hypochlorite slurry is admixed with the finely divided dry calcium hypochlorite product by any means suitable to produce the desired granulation. I have found that a "cutting type" of mixer is particularly well suited for this purpose. By this method fresh surfaces are constantly exposed to be covered by the finely divided material thus producing nonadhesive granules. The mixing step of my invention is, however, not limited to such a method of mixing since other means as, for example, a mixer employing a muller and mixing star equipped with plows may be used.

After the granulation operation, in which the water content of the mixture is reduced to a value between about 20% and 30%, the granular material is dried by means which do not involve substantial crushing of the material. For this purpose, various types of vacuum driers are appropriate. Rotary vacuum driers are advantageous, particularly if the drier has no lifts, shelves or other projections on the inside shell, and contains no stationary apparatus within the shell other than the vacuum manifold and its guard. Such apparatus avoids any substantial crushing of the material and does not tend to scrape off the coating of fine particles adhering to the granules. When vacuum driers are used I have found that a high vacuum, i. e., 28–29 inches is particularly advantageous in that it assists in drying the material at a rapid rate. Although I prefer vacuum driers, the granular material may also be dried by suspending the particles in a stream of heated air.

The following analyses will serve to illustrate the composition of a calcium hypochlorite slurry and of a dry, finely divided calcium hypochlorite product suitable for use in the process of the present invention. In column I is presented the composition of a filter cake resulting from a calcium hypochlorite slurry, while in column II is presented a weight analysis of a dry, finely divided calcium hypochlorite product which may be added to the product of column I.

|  | Column I | Column II |
| --- | --- | --- |
|  | Percent | Percent |
| Calcium hypochlorite | 43 | 74 |
| Calcium chlorite | 0 -0.5 | 0-1 |
| Calcium hydroxide | .5-1 | 1-3 |
| Calcium carbonate | .5-1.5 | 1-2 |
| Calcium chloride | 0 -0.5 | 0-2 |
| Sodium chloride | 11 | 18 |
| Water | 44 | 1 |

Also, according to my invention, the calcium hypochlorite material produced by the mixing step of the process is sized, either before or after the drying step, or both before and after drying. In this way any finely divided material which may not have adhered to the surfaces of the granules during mixing or which has been removed by abrasion during drying, together with any granular material in excess of a desired maximum particle size, is eliminated. Another important advantage of my process is that a severe sizing operation to remove both fines and large particles to any desired degree may be employed without prejudice to ultimate recovery. The dust and fines removed in this sizing operation are employed in subsequent preparation of the calcium hypochlorite mixture. The oversize particles may be crushed to produce dry fines which then may also be employed in subsequent preparation of the mixture. In this aspect, the process of my invention comprises a cyclic return to the mixing step, in the form of dry fines, of all, or any desired proportion, of particles smaller or larger than desirable as components of the final calcium hypochlorite product, this returned material ultimately being absorbed as part of the final product.

I claim:

1. In the production of a granular, substantially dustless calcium hypochlorite product, the improvement which comprises mixing a calcium hypochlorite slurry containing upwards of 30% water with a proportion of a dry, finely divided calcium hypochlorite product sufficient to produce a mixture having a water content of about 20-30% and drying this mixture without substantial crushing.

2. In the production of a granular, substantially dustless calcium hypochlorite product, the improvement which comprises mixing a calcium hypochlorite slurry having a water content approximating 42-48% with a proportion of a dry, finely divided calcium hypochlorite product sufficient to produce a mixture having a water content of about 20-30% and drying this mixture without substantial crushing.

3. In the production of a granular, substantially dustless calcium hypochlorite product, the improvement which comprises mixing a calcium hypochlorite slurry containing upwards of 30% water with a proportion of a dry, finely divided calcium hypochlorite product sufficient to produce a mixture having a water content of about 24-26% and drying this mixture without substantial crushing.

4. In the production of a granular, substantially dustless calcium hypochlorite product, the improvement which comprises mixing a calcium hypochlorite slurry containing upwards of 30% water with a proportion of a dry, finely divided calcium hypochlorite product sufficient to produce a mixture having a water content of about 20-30% and drying this mixture without substantial crushing and sizing the mixed product to eliminate particles smaller and larger than desirable as components of the final product.

5. In the production of a granular, substantially dustless calcium hypochlorite product, the improvement which comprises mixing a calcium hypochlorite slurry containing upwards of 30% water with a proportion of a dry, finely divided calcium hypochlorite product sufficient to produce a mixture having a water content of about 20-30% and drying this mixture without substantial crushing, sizing the mixed product to eliminate fines and returning such fines to the mixing operation.

6. In the production of a granular, substantially dustless calcium hypochlorite product, the improvement which comprises mixing a calcium hypochlorite slurry containing upwards of 30% water with a proportion of a dry, finely divided calcium hypochlorite product sufficient to produce a mixture having a water content of about 20-30% and drying this mixture without substantial crushing, sizing the mixed product to eliminate oversize particles, crushing such oversize particles and returning the crushed material to the mixing operation.

7. In the production of a granular substantially dustless calcium hypochlorite product, the improvement which comprises mixing a calcium hypochlorite slurry containing upwards of 30% water with a proportion of a dry, finely divided calcium hypochlorite product sufficient to produce a granular mixture having a water content of about 20-30%, sizing the granular mixture to eliminate granules smaller and larger than desirable as components of the final product, and drying the mixture without substantial crushing.

MAURICE C. TAYLOR.